United States Patent [19]

Ludwig et al.

[11] Patent Number: 4,844,230
[45] Date of Patent: Jul. 4, 1989

[54] INSTALLATION FOR SORTING OUT REJECT SLUGS OUT OF THE SLUG CHANNEL OF AN AUTOMATIC COINING MACHINE

[75] Inventors: Albert Ludwig, Lauterstein; Karl-Heinz Philipp; Gerhard Hartl, both of Goeppingen; Berthold Jarosch, Gingen; Horst Greger, Unterhaching, all of Fed. Rep. of Germany

[73] Assignee: L. Schuler GmbH, Goeppingen, Fed. Rep. of Germany

[21] Appl. No.: 235,512

[22] Filed: Aug. 24, 1988

[30] Foreign Application Priority Data

Aug. 27, 1987 [DE] Fed. Rep. of Germany ....... 3728649

[51] Int. Cl.⁴ ............................................. G07D 5/02
[52] U.S. Cl. ................................... 194/335; 194/338; 453/9
[58] Field of Search ............... 194/334, 335, 338; 453/5, 9, 14, 15; 72/359

[56] References Cited

U.S. PATENT DOCUMENTS

| 852,111 | 4/1907 | Fritsche | 194/335 |
| 2,861,579 | 11/1958 | Hoban | 453/14 |
| 3,200,926 | 8/1965 | Hall | 194/335 X |
| 3,289,802 | 12/1966 | Greenwald et al. | 194/335 X |
| 3,559,790 | 2/1971 | Greenwald et al. | 194/335 X |
| 3,896,916 | 7/1975 | Ruzic et al. | 194/335 |

FOREIGN PATENT DOCUMENTS 2106686 4/1983 United Kingdom ............... 194/335

Primary Examiner—F. J. Bartuska
Attorney, Agent, or Firm—Barnes & Thornburg

[57] ABSTRACT

An installation for sorting out reject slugs out of the slug channel of an automatic coining machine with a slug control mechanism, whereby the reduction of the reaction time for the rejection of slugs to be sorted out permits a considerable increase of the number of coining strokes of the automatic coining machine, without the need for a further additional intermediate storage of slugs. The reject channel for rejected slugs is thereby kept closed by shaped members in the manner of shutters and is opened up in case of need whereby also the desired dimensions for the slugs are determined by the shaped members. Such a slug control mechanism is needed in the slug channel of an automatic coining machine in order to separate good slugs from reject slugs.

16 Claims, 5 Drawing Sheets

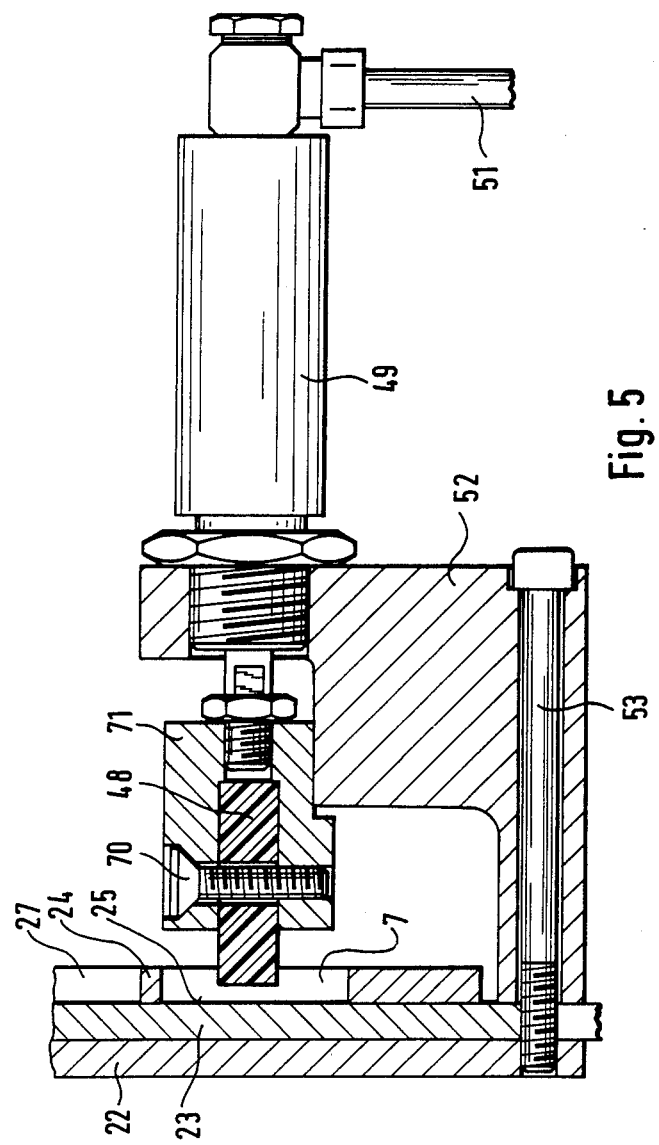

INSTALLATION FOR SORTING OUT REJECT SLUGS OUT OF THE SLUG CHANNEL OF AN AUTOMATIC COINING MACHINE

BACKGROUND AND SUMMARY OF THE INVENTION

The present invention relates to an installation for sorting out disk-like slugs out of the slug channel of an automatic coining machine with a slug control mechanism for determining reject slugs, with an arrangement for determining an interruption in the feed of the slugs, arranged downstream of the slug control mechanism as viewed in the travel direction, with a device for stopping the feed of slugs to the slug control mechanism and with means for ejecting sorted-out slugs out of the slug channel.

The increase of the production output of automatic coining machines requires a slug control in the feed system which reacts dependent on the machine cycle—at the cyclic rate of the ram. The discharge of the reject slugs is to take place automatically and is to occur at such a speed that also at high stroke numbers a standstill of the automatic coining machine is avoided.

Disk-like slugs are fed in automatic coining machines by way of rotary or vibration drums to a slug channel and in vertical automatic coining machines by way of the later, for example, to an individualization device which by separation provides for the feed of individual slugs one after the other. The disk-like slugs delivered from the separating chute by means of a separating slide member to a revolving disk are to be fed to the coining station. For avoiding defective coinings, a slug control station is provided in the feed channel (the assignee's own construction), by means of which the reject slugs are sorted out. The slugs coming from the drum pass through areas adjusted to thickness and diameter. A bent or excessively thick slug as well as a slug deviating in diameter from the desired slug thereby blocks the further feed of slugs in the feed channel between the slug control station and the individualization device.

Both the feed to the slug control mechanism as also the transmittal into the continuing slug channel is prevented by way of one slide member each during the occurrence of an interference (occurrence of a reject slug), which is to be determined by way of sensors. The recognized reject slug is blasted out of the area of the slug control mechanism by outflowing air. The automatic coining machine continues to run for such length of time as slugs are present in the feed channel and the individualization device and with the use of a revolving disk, are then also present in the same. However, it has now been found that only with the use of two feed channels between the slug control mechanism and the individualization slide member which require a considerably greater space demand, sufficient stored slugs are present to bridge the reaction time of the slug control mechanism. As test runs have indicated, a further increase of the stroke number of the automatic coining machine to, for example, to 700 strokes per minute and above is not possible if such a slug control mechanism is to be used.

In contrast thereto, it is the object of the present invention to provide a slug control mechanism of the aforementioned type whose reaction time for the ejection of sorted-out slugs is reduced in order to enable a considerable increase of the number in coining strokes from, for example, 400 to, for example, 700 strokes per minute and thereabove on the part of the automatic coining machine without the need for a further additional intermediate storage of slugs.

The underlying problems are solved according to the present invention in that an aperture for the passage of sorted-out slugs is provided in the bottom of the slug channel, the aperture is at least partially kept closed by at least one shaped member, the one shaped member is movably supported in the manner of a shutter in front of the aperture by way of a pressure cylinder to open up the aperture for short periods of time, the shaped member includes a first abutment surface, a similar first abutment surface is disposed mirror-image-like opposite to the first-mentioned abutment surface at a fixed shaped member for the further conduction of slugs with the desired diameter, the first mentioned shaped member includes a second abutment surface, a similar second abutment surface is disposed mirror-image-like to the first abutment surface at the fixed shaped member, whereby the second abutment surfaces are arranged in the travel direction of the slugs in front of the first abutment surfaces and pass over into an area tapering to the desired diameter of the slugs for blocking a slug with excessive diameter, the shaped members include support surfaces extending at the same height and aligned with the bottom of the slug channel, with respect to which the first and second abutment surfaces are disposed perpendicularly, the shaped members include aperture surfaces arranged at a distance from one another whose distance from one another corresponds to the diameter of too small a slug, and the slug channel is limited in its height by a fixed thickness gauge with a support surface which is at a distance to the support surfaces at the shaped members, and with an inclined inlet surface which is inclined to the travel direction of the slugs for a large opening width for the detection of slugs also deviating in thickness.

In addition to the advantages of a considerably higher output of the automatic coining machine with the slug control mechanism according to the present invention, it has been found in an advantageous manner that only the inlet to the slug control mechanism has to be blocked by a stoppage device. The shaped members predetermining the desired dimensions serve at the same time for the opening of the rejection channel, i.e., the determination of a reject slug effects a release movement of the part which has determined the deviation. The reaction periods could be considerably reduced by this recognition in accordance with the present invention. The shaped members are mirror-image-like at least within the areas having the desired and limit dimensions so that the manufacture thereof and installation is facilitated from that point of view. The slug control installation is adjustable with few manipulations to a slug with different dimensions.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 5 is a cross-sectional view, taken along line V—V of FIG. 2.

DETAILED DESCRIPTION OF THE DRAWINGS

Figure 1:
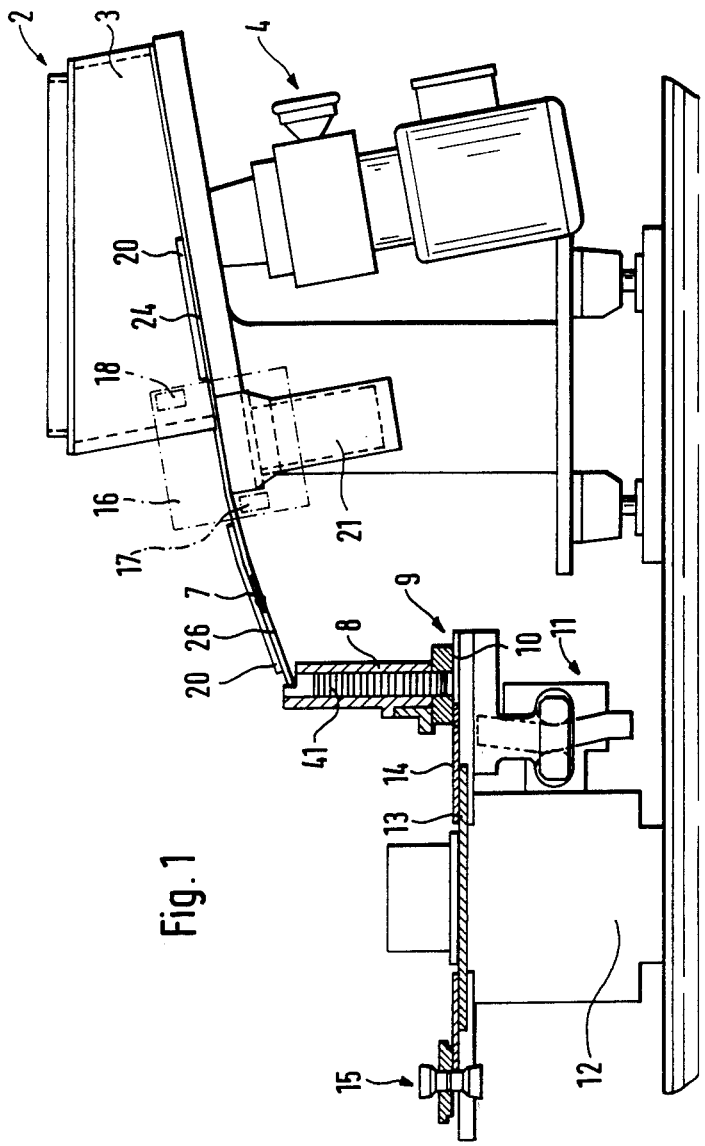
FIG. 1 is a somewhat schematic elevational view on a reduced scale indicating essential elements of an automatic coining machine with the indicated position of an installation according to the present invention.

Referring now to the drawing wherein like reference numerals are used throughout the various views to designate like parts, the automatic coining machine which in the illustrated embodiment is a vertically operating machine, includes according to FIG. 1 a dosing installation generally designated by reference numeral 2 with a dosing drum 3 and a rotary or also vibration drive 4. Disk-like slugs 41 to 44 are fed from the dosing drum 3 by way of a slug channel 7 which is formed by guide bars 20, 24 and 26 and a sheet metal support panel 23 (FIG. 2) to an individualizing device generally designated by reference numeral 9. The individualizing device 9 essentially consists of a separating chute 8, a separating slide member 10 below the chute 8 and of a cam control generally designated by reference numeral 11 for the individualized movement and effects a delivery of individual slugs to a revolving disk 13 with receiving pockets 14 which is driven step-wise by means of a shifting gear 12. The slugs 41 in the revolving disk 13 are fed at the cyclic rate of the automatic coining machine to a coining tool 15.

A slug control mechanism 16 is installed in the slug channel 7 for sorting out reject slugs 42 to 44. A stoppage device is indicated by reference numeral 18 which always blocks the feed to the slug control mechanism 16 when a sensor 17 in the slug channel 7 between the slug control mechanism 16 and the separating chute 8 determines the absence of a slug.

Figure 2:
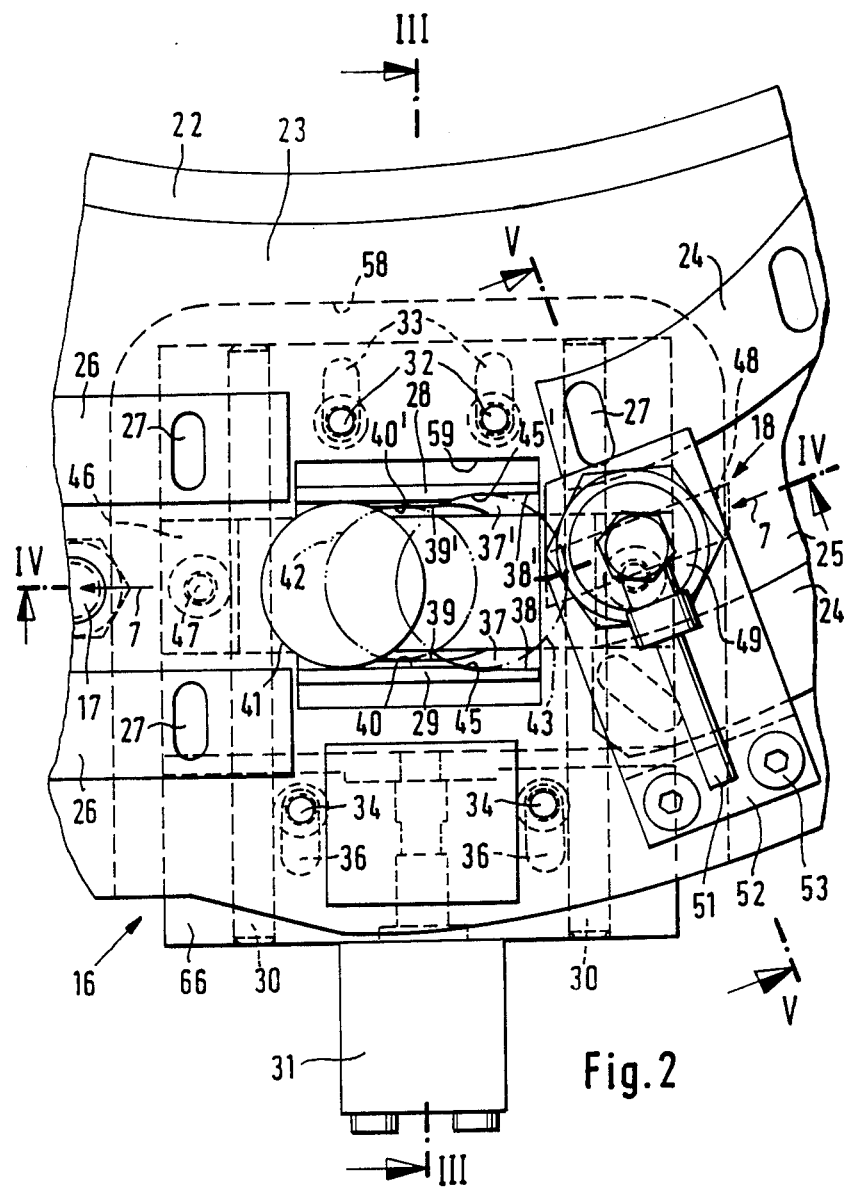
FIG. 2 is a plan view on the installation according to the present invention.
Figure 3:
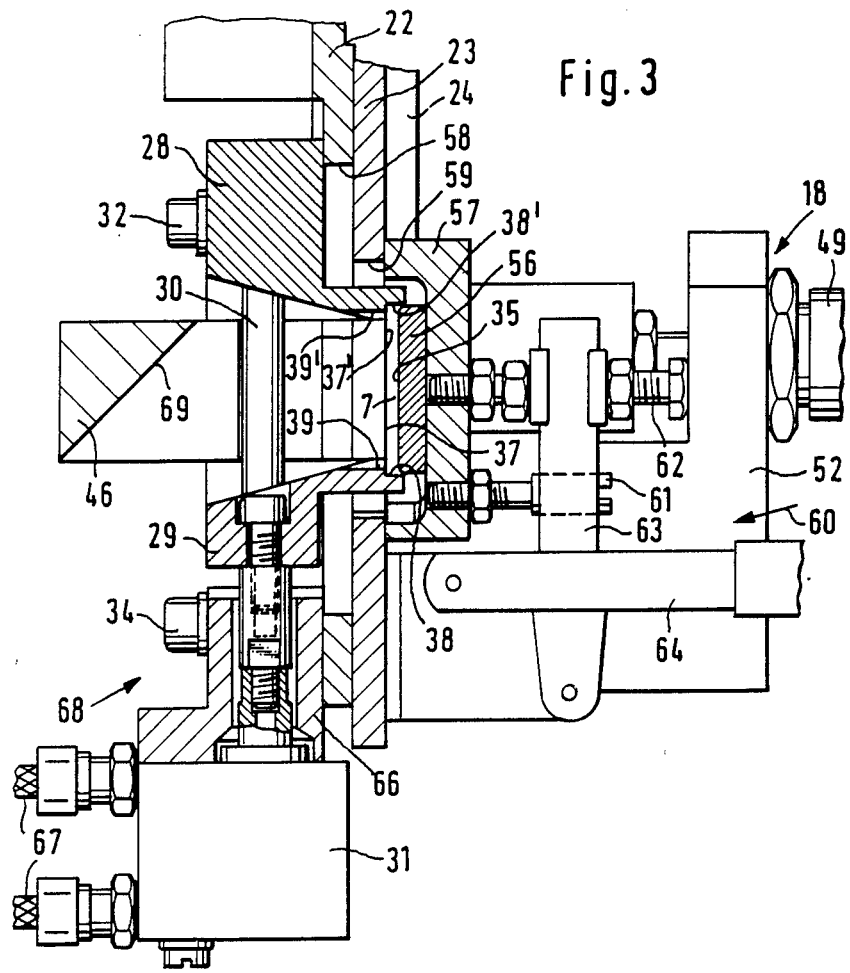
FIG. 3 is a cross-sectional view, taken along line III—III of FIG. 2.

The slug control installation 16 illustrated in FIG. 2 is inserted into apertures 58 and 59 of the bottom plate 22 and of the sheet metal support panel 23. The guide bars 24 and 26 laterally delimiting the slug channel 7 are adjustable in elongated apertures 27 to the diameter dimension of the slugs 41 to 44. As can be seen from FIG. 2 in conjunction with FIG. 3, a rear shaped-member 28 and a forward shaped-member 29 are placed from below against the bottom plate 22. The rear shaped-member 28 is adjustably threadably connected in elongated apertures 33 by way of threaded means 32. The shaped member 29 is movably guided by guide pins 30 (FIG. 3). A pressure cylinder 31, which serves for the movement of the shaped member 29, is fixed at a bearer 66. The adjustment of the bearer 66 takes place in elongated apertures 36 by means of fastening means 34. The bearer 66 additionally receives at the opposite side of the guide pins 30. The position of the shaped member 29 is finely determinable by adjusting means 68. Furthermore, a bridging part 46 is attached from below against the bottom plate 22 by way of fastening means 47 which has an inclined run-off surface 69 for conducting reject slugs 52 to 44 into the reject container 21 indicated in Figure 1. Reference numeral 25 indicates the bottom of the slug channel 7 on which the slugs 41 to 44 slide under gravity. Support surfaces 37 and 37' are disposed at the same height on the shaped members 28 and 29. The shaped member 29 includes a first abutment surface 40 disposed perpendicular to the support surface 37, with respect to which a similar first abutment surface 40' is disposed opposite at the shaped member 28. The spacing of the abutment surfaces 40 and 40' from one another corresponds to the desired diameter of a good slug 41 (full line). The shaped member 29 includes a second abutment surface 38, with respect to which a similar second abutment surface 38' is disposed opposite at the shaped member 28. The spacing of these second abutment surfaces 38 and 38' from one another is larger than the possible diameter of a reject slug 43 (dash-and-dotted line). The second abutment surfaces 38 and 38' terminate in rounded-off, respectively, tapering portions 45 and 45' for the abutment of a reject slug 43. The shaped members 28 and 29 further include aperture surfaces 39 and 39' spaced from one another which are also disposed perpendicularly to the support surfaces 37 and 37'. The spacing thereof from one another corresponds to the possible maximum diameter of too small a slug which is no longer acceptable (42) (dot-dot dash line).

FIG. 3 further illustrates pressure lines 67 to the pressure cylinder 31 as well as a disengaging device 60 with a pivotal lever 64, a pivot arm 63 retained in the illustrated position by the lever 64, at which is retained a valve 57 by way of an adjusting bolt 61 and a retaining bolt 62. The valve 57 rests on the sheet metal support panel 23.

Figure 4:
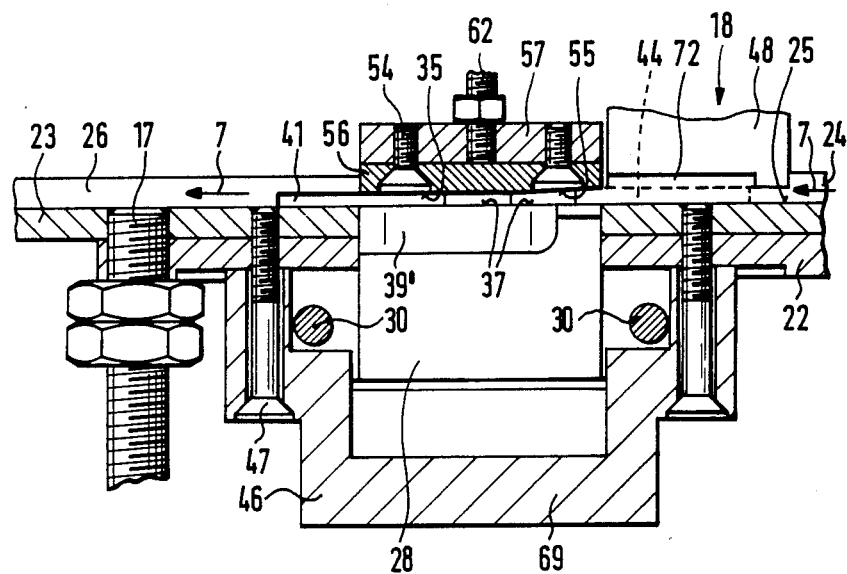
FIG. 4 is a cross-sectional view, taken along line IV—IV of FIG. 2.

As can be seen more clearly from FIG. 4, the valve 57 carries at its side facing the slug channel 7 a thickness gauge 56 by way of threaded means 54. The thickness gauge 56 spaced with respect to the support surfaces 37 and 37' at the shaped members 28 and 29 includes an inclined surface 55 open to the arriving slugs 41 to 44 and inclined toward the slug channel 7 which passes over into a support surface 35. The spacing of the support surface 35 at the thickness gauge 56 from the support surfaces 37 and 37' at the shaped members 28 and 29 corresponds approximately to the desired thickness of a slug 41 so that an excessively thick slug 44 (dash line) remains stuck at the inclined inlet surface 55.

FIG. 4 further illustrates in conjunction with FIG. 2 a sensor 17 in the terminating slug channel 7 and in conjunction with FIG. 5 a stoppage device 18 having a pressure cylinder 49 fixedly attached at the frame by an angle bracket 52 and by way of fastening means 53. The pressure cylinder 49 is adapted to be actuated in two positions by way of a pressure line 51. The piston rod projecting out of the pressure cylinder 49 carries a retaining member 48 movably supported for to-and-fro movement by way of fastening means 70 in a slide member 71 displaceable on the angle bracket 52. The retaining member 48 is provided with a recess 72 in order to block the inlet to the slug control mechanism 16, when a slug 44 abuts at the inclined inlet surface 55, without impairing the ejection of the reject slug 44.

If the absence of a slug in the terminating slug channel 7 is determined by means of the sensor 17, the stoppage device 18 at first closes off the inlet to the slug control mechanism 16 and the pressure cylinder 31 is actuated so that the movable shaped member 29 acting as shutter or also trap door is retracted. The slug 42 to 44 to be sorted out drops down onto the inclined surface 69 and continues into the reject container 21. It is understood that the shaped member 28 fixedly installed in the illustrated embodiment can also be arranged actuatable in a manner similar to the shaped member 29 in order to be able to further reduce the reaction time of the slug control installation 16.

While we have shown and described only one embodiment in accordance with the present invention, it is understood that the same is not limited thereto but is susceptible of numerous changes and modifications as known to those skilled in the art, and we therefore do not which to be limited to the details shown and described herein but intend to cover all such changes and modifications as are encompassed by the scope of the appended claims.

We claim:

1. An installation for sorting out reject slugs out of a slug channel means of an automatic coining machine, comprising slug control means for determining reject slugs, sensing means arranged downstream of the slug control means as viewed in the travel direction for determining an interruption in the feed of slugs, stoppage means for stopping the feed of slugs to the slug control means, ejection means for ejecting sorted-out slugs out of the slug channel means, aperture means for the passage of sorted-out slugs provided in the bottom of the slug channel means, the aperture means being kept closed at least partially by at least one shaped member, said one shaped member being movably supported in the manner of a shutter in front of the aperture means movable by way of a pressure cylinder to open up the aperture means for short periods of time, said one shaped member having a first abutment surface means, a similar first abutment means being disposed mirror-image-like opposite said first abutment surface means at another shaped member for the further conduction of slugs with desired diameter, the one shaped member having a second abutment surface means, a similar second abutment surface means being disposed mirror-image-like to the second abutment surface means at said another shaped member, the second abutment surface means being arranged ahead of the first abutment surface means as viewed in the travel direction of the slugs, the second abutment surface means passing over into an area tapering to the desired diameter of the slugs for blocking a slug with excessive diameter, said shaped members being provided with support surface means extending at the same height and aligned with the bottom of the slug channel means, the first and second abutment surface means being substantially perpendicular to the support surface means, the shaped members having aperture surface means arranged at a distance from one another whose distance from one another corresponds to the slug diameter of a slug which is too small, and the slug channel means being delimited in its height by a relatively fixed thickness gauge means having a support surface which is disposed at a distance to the support surface means at the shaped members and having an inclined inlet surface means which is inclined in the travel direction of the slugs for a large opening width for the detection of slugs which also deviate in thickness.

2. An installation according to claim 1, wherein the shaped members are mirror-image-like in their first and second abutment surface means and aperture surface means.

3. An installation according to claim 1, wherein the shaped members are arranged adjustable with respect to one another and in relation to the slug channel means.

4. An installation according to claim 1, wherein the shaped members at least partially close off the slug channel means in the downward direction inside of the slug control means.

5. An installation according to claim 1, wherein the thickness gauge means is interchangeable.

6. An installation according to claim 5, further comprising a bridging part placed against the slug channel means from below, which is interchangeable.

7. An installation according to claim 1, wherein at least one of the shaped members is movably arranged by way of a pressure cylinder means.

8. An installation according to claim 7, wherein both shaped members are movably arranged by way of pressure cylinder means.

9. An installation according to claim 7, wherein said another shaped member is fixed relative to the automatic coining machine.

10. An installation according to claim 2, wherein the shaped members are arranged adjustable with respect to one another and in relation to the slug channel means.

11. An installation according to claim 10, wherein the shaped members at least partially close off the slug channel means in the downward direction inside of the slug control means.

12. An installation according to claim 10, wherein the thickness gauge means is interchangeable.

13. An installation according to claim 12, further comprising a bridging part placed against the slug channel means from below, which is interchangeable.

14. An installation according to claim 10, wherein at least one of the shaped member is movably arranged by way of a pressure cylinder means.

15. An installation according to claim 14, wherein both shaped members are movably arranged by way of pressure cylinder means.

16. An installation according to claim 14, wherein said another shaped member is fixed relative to the automatic coining machine.

* * * * *